United States Patent

[11] 3,570,802

| [72] | Inventor | Ira B. Miller<br>Orange, Calif. |
|---|---|---|
| [21] | Appl. No. | 766,396 |
| [22] | Filed | Oct. 10, 1968 |
| [45] | Patented | Mar. 16, 1971 |
| [73] | Assignee | Hydro Conduit Corporation<br>Orange, Calif. |

[54] CONCRETE-MOLDING APPARATUS HAVING AN INNER MOLD MEMBER WITH VARIABLE DIMENSION PERIPHERY
12 Claims, 5 Drawing Figs.

| [52] | U.S. Cl. | 249/179,<br>249/152 |
|---|---|---|
| [51] | Int. Cl. | B28b 7/30 |
| [50] | Field of Search | 249/152,<br>153, 175, 178, 179, 180, 181, 182, 48, 50; 25/128<br>(R), 128 (S), 128 (E), 128 (K), 128.1; 18/45 (M),<br>(Camming Digest), (Core Positioning Digest) |

[56] References Cited
UNITED STATES PATENTS

| 2,075,591 | 3/1937 | Schuster | 249/181 |
|---|---|---|---|
| 2,730,783 | 1/1956 | Kennison | 25/128 |
| 2,994,922 | 8/1961 | Robson et al. | 25/128X |
| 3,213,512 | 10/1965 | Glass | 25/128 |
| FOREIGN PATENTS | | | |
| 22,515 | 10/1911 | Great Britain | 249/179 |
| 159,614 | 4/1933 | Switzerland | 249/152 |

*Primary Examiner*—J. Spencer Overholser
*Assistant Examiner*—Lucius R. Frye
*Attorney*—McGrew and Edwards ABSTRACT: Withdrawal assembly for inner mold of a concrete tube mold having a linear seam throughout the lengthwise extent of a peripheral surface, mechanism adjacent the seam throughout its extent including a member having tapered sides for wedging insertion into the seam to spread the abutting surfaces and spring-biased drive means interiorly of the mold carrying the insert member and arranged to force said member into the seam in a spreading and sealing action for closing the seam during molding and initiating a withdrawal movement of the insert member with combined spring actuation thereby reducing the dimension of the peripheral surface by closing the seam to provide clearance with a formed tube in the mold.

INVENTOR.
Ira B. Miller
ATTORNEYS

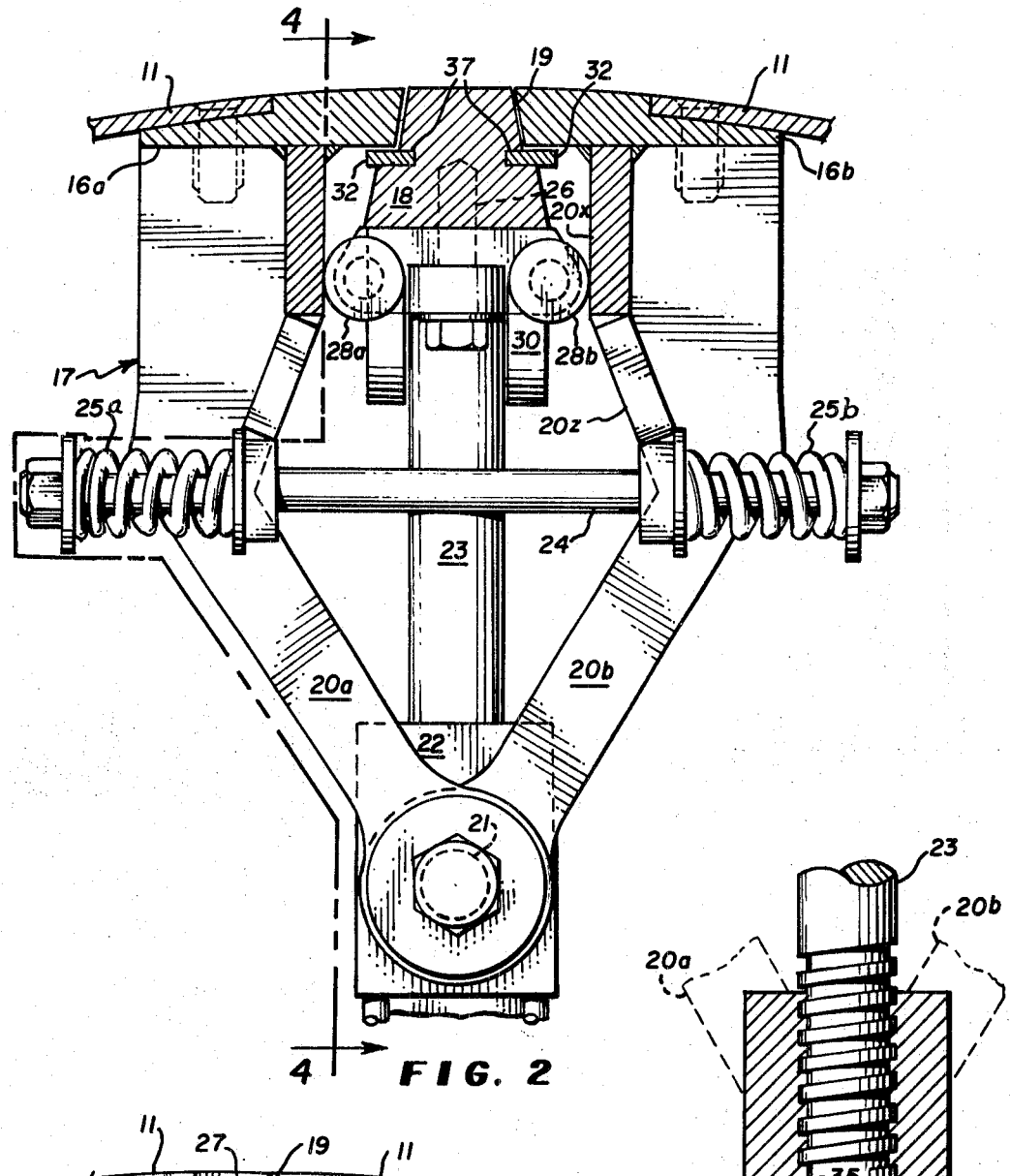
FIG. 2
FIG. 5
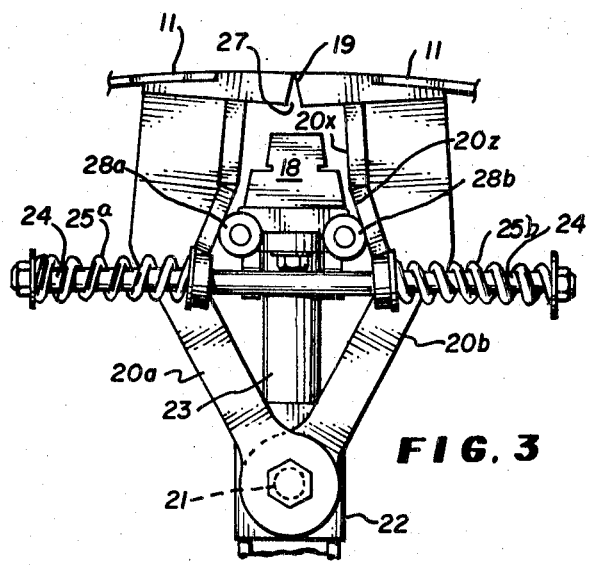
FIG. 3
INVENTOR.
Ira B. Miller
ATTORNEYS

CONCRETE-MOLDING APPARATUS HAVING AN INNER MOLD MEMBER WITH VARIABLE DIMENSION PERIPHERY

This invention relates to an inner mold construction of apparatus for molding tubular concrete shapes and the like and also relates to mechanism for effecting removal of an inner mold member of such molding apparatus from associated molded material.

The practice of molding concrete and similar plastic materials or mixes into tubular or cylindrical shapes has developed to a considerable degree in recent years, particularly in connection with transport of domestic water supply or irrigation water and waste water, such as sewage and the like, in concrete pipe formed of connected sections adapted to conduct large volume flow and able to withstand high-pressure flows in the interior of the line without leakage or damage to the line. Molding apparatus adapted to produce such shapes includes both vertically and horizontally disposed arrangements having an outer mold member mounted in spaced relation to an inner mold member so as to provide a predetermined thickness for the cast concrete or other molded material introduced into such mold.

After the plastic mix has filled the mold, it commences to set and as soon as it has set sufficiently to be a self-sustaining body, it is desirable to separate the molded shape from the mold components. Removal of the outer mold member is easily effected because of accessibility for attachment of mechanism capable of stripping the outer mold from the molded material. However, removal of the inner mold presents considerable difficulty because of the close fit of the inner surface of the molded material to the external surface of the inner mold. The arrangements available to the industry at the present time for removal of the inner mold are cumbersome, expensive and in general are rather inefficient. The practice of my invention provides a novel structural arrangement for an inner mold member of molding apparatus for tubular concrete shapes which includes a peripheral molding surface of selectively variable dimension providing maximum dimension during progression of the molding procedure and a lesser dimension when such mold member is separated from the molded shape. Another innovation of the present invention is the provision of a novel type of actuating mechanism for moving an elongated insert member into a seam extending throughout the lengthwise extent of a peripheral surface of the inner mold. The seam in this arrangement has abutting edges which are moved into abutting contact by the resilience of the cylindrical body when the insert member is withdrawn from the seam and which are arranged to be moved by a spreading action to a separated position in which the insert member fills the space between the abutting edges at the periphery of the mold and thus provides a smooth exterior cylindrical surface during the progress of the molding operation. The mechanism utilized in producing the spreading and withdrawal actions preferably has a hydraulic drive, although a pneumatic drive or a mechanical drive as by screw action may be provided if desired.

Accordingly, it is an object of my invention to provide a simple, durable and efficient inner mold member of a molding apparatus for producing tubular concrete shapes and the like which may be utilized in assemblies of molding apparatus having the lengthwise axis of the mold disposed in either a horizontal or a vertical plane.

Another object of the invention is to provide a novel type of inner mold member for forming hollow tubular shapes which has a seam in its peripheral surface extending throughout the lengthwise extent of such surface and arranged to be spread by mechanism disposing an elongated structure in the space between separated exterior peripheral surface portions of the mold.

A further object of the invention is to provide a drive mechanism for an insert member of an inner cylindrical mold having a seam associated with said member, which mechanism includes spring-biased members which assist in providing the movement of parts in withdrawal of the member from the seam.

Other objects reside in novel details of construction and novel combinations and arrangements of parts, all of which will be set forth in the course of the following description. In the drawings, in the several views of which like parts bear similar reference numerals, FIG. 1 is a fragmentary isometric view of the interior of an inner molding member embodying features of my invention, said member having a seam throughout its lengthwise extent and having associated mechanism for moving an insert member in and out of contact with the abutting edges defining the seam;

FIG. 2 is an end elevation of one of the adjustable support assemblies connecting a preferred form of insert member with a hydraulic drive for disposing said insert member in and out of engagement with abutting seam forming edges of the inner mold member shown in FIG. 1;

FIG. 3 is another end elevation similar to FIG. 2 showing the insert member in a withdrawn position and drawn to a smaller scale;

FIG. 5 is a fragmentary and elevation of a support structure similar to that shown in FIGS. 1 through 4 in driven relation to the rotating screw of a screw-type mechanical drive.

Figure 1:
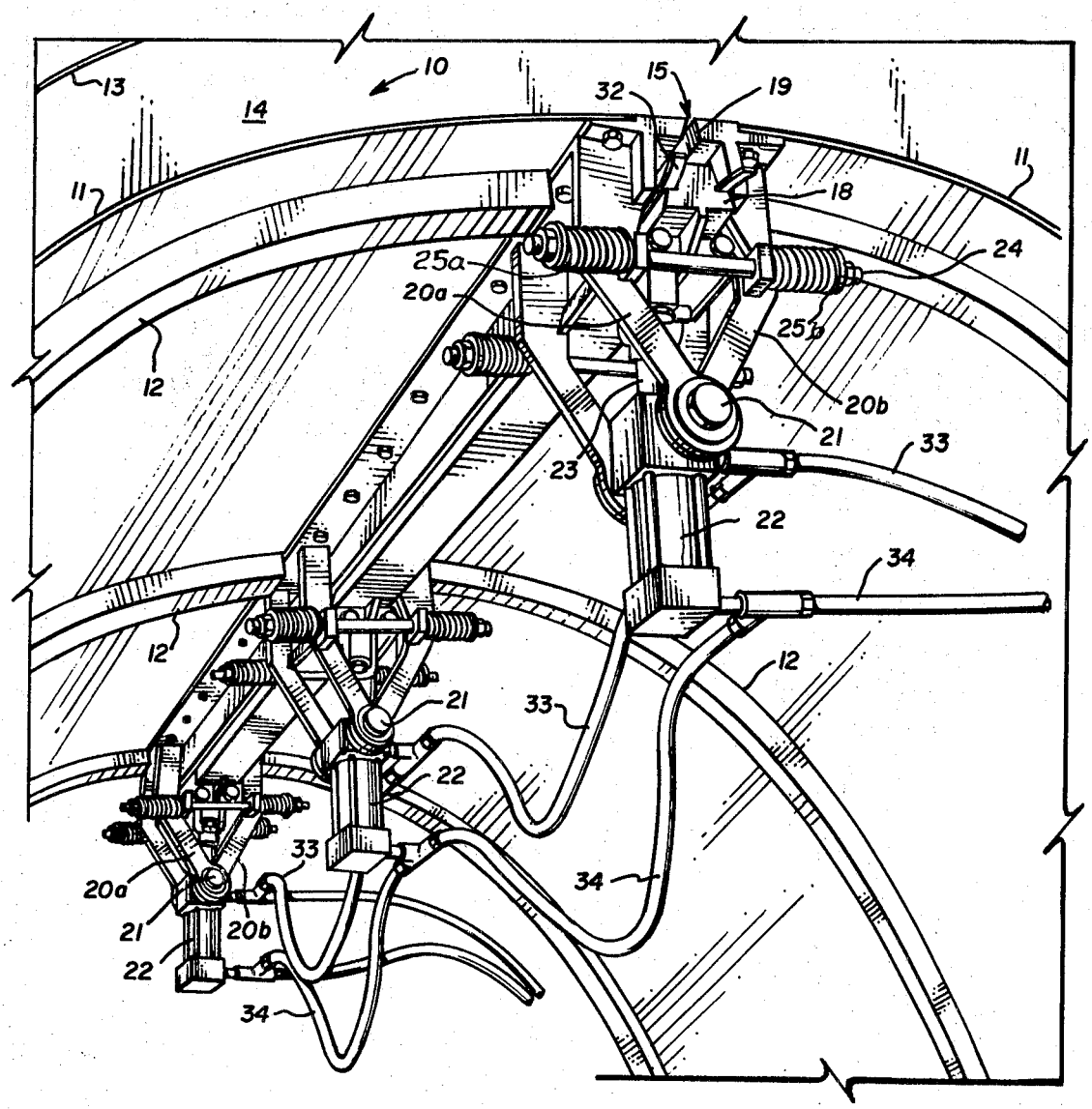
Figure 4:
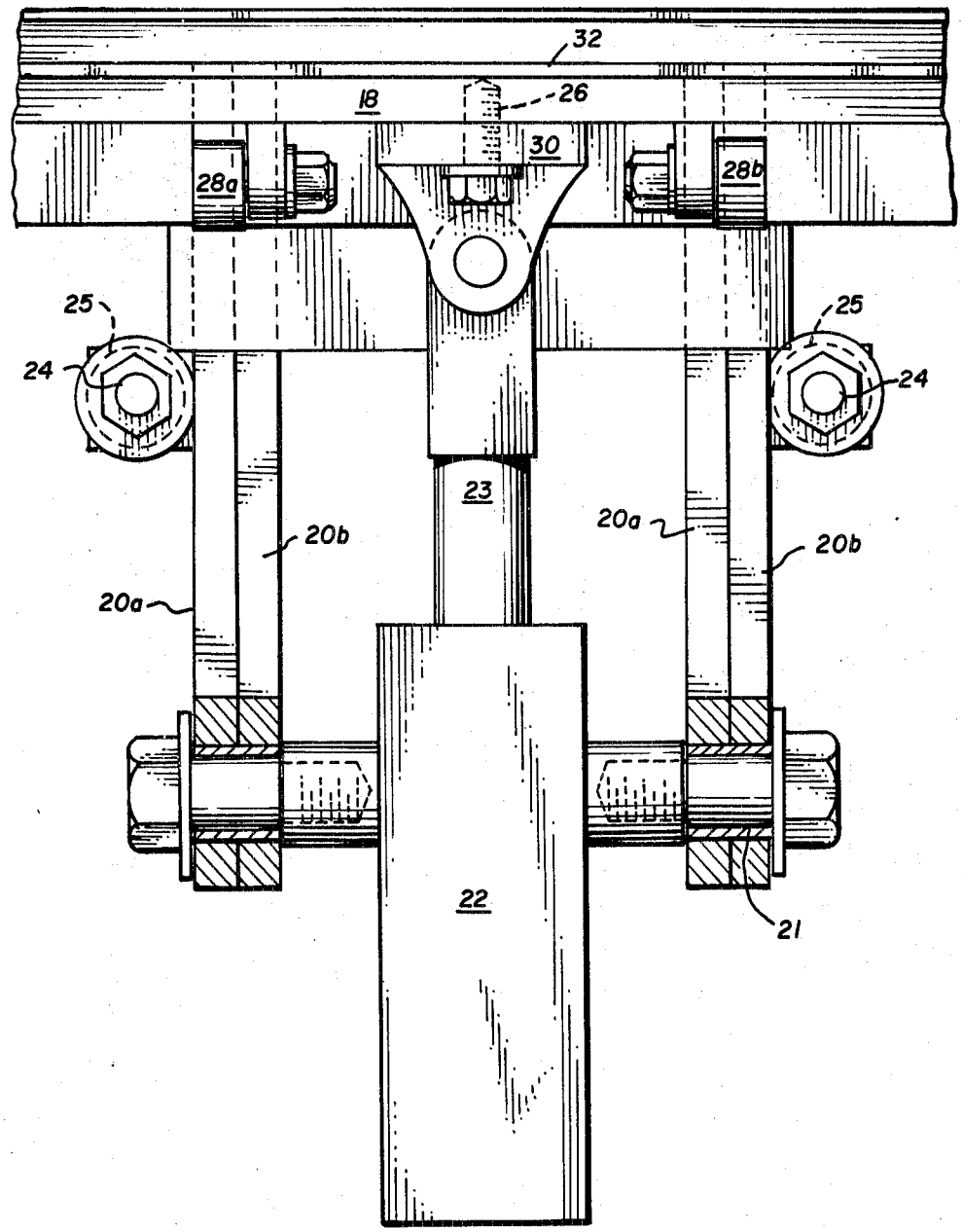
FIG. 4 is a side elevation of the assembly shown in FIG. 2.

As shown in FIG. 1, molding apparatus 10 embodying features of my invention will comprise an inner mold member 11 preferably having an arrangement of annular internal supports 12 at its ends and, if sufficiently elongated, in the intermediate portion as well. The molding apparatus also includes an outer cylindrical mold member 13 not shown in detail but indicated in a fragmentary portion by reference numeral 13. The space at the ends of the mold members preferably is covered as by the cover plate 14 shown in FIG. 1. While the molding apparatus illustrated has the lengthwise axis of the mold disposed in a horizontal direction, it will be understood that the practice of the present invention is equally effective with molds having their lengthwise axes disposed in a vertical plane.

A linear seam or plotlike opening 15 is by splitting or opening the peripheral surface of inner mold member 11 throughout its lengthwise or longitudinal extent and preferably this seam has tapered sides 19 as shown in FIGS. 2 and 3. Beams 16a and 16b are secured to the exposed surface of inner mold member 11 adjoining the seam 15 and are coextensive with the length of said seam. The beams 16a and 16b carry support structure 17 for a longitudinal wedging insert member 18 which is adapted to fit between the abutting sides of the seam is to extend the periphery of inner mold member when so located and which is movable out of contact with the abutting sides 19 of the seam to provide a retraction action bringing the abutting sides into engagement with resulting reduction in the circumferential dimension of the mold causing it to move away from molded material with which it was associated in the molding action for separation of the inner mold from the molded material.

The support structure 17 shown in FIG. 1 comprises pair of arms 20a and 20b connected to the beams 16a and 16b, respectively, and having a hinged or pivotal connection 21 at their lower ends providing a scissorlike action directed by movements of drive means, preferably a hydraulic piston. The piston housing 22 provides a support for the hinged connection 21 and a rod 23 of the piston assembly supports and has a driving connection with wedging insert member 18. The arms 20a and 20b are guided by a threaded rod 24 holding spring members 25a and 25b in biasing arrangement to arms 20a and 20b, respectively. Similar support structure to that just described is located on the opposite side of piston housing 22 so that the support structure associated with each piston comprises two assemblies of coacting pairs of arms 20a and 20b. Each of these pairs of arms 20a and 20b straddles the insert member 18 of the slotlike opening 15.

Support structure as described will be located at intervals along the length of the mold, as, for example, 4 feet or 6 feet, and with at least one such support structure disposed at each end of the seam of a mold. The arrangement shown in FIG. 1 in which three such support structures are utilized is representative of apparatus molding eight or twelve feet lengths of pipe.

The hydraulic piston is arranged to impart advancing and retracting movements to rod 23 which as shown in FIG. 2 has a fixed connection 26 with insert member 18. When an elevating movement is applied, the rod 23 extends the insert member 18 from the retracted position shown in FIG. 3 to the position shown in FIG. 2 in which it is wedged between the tapered sides 19 substantially spreading said sides in it wedging insertion and effectively closing the seam opening so that the inner mold member 11 provides an essentially imperforate surface against which the concrete or other material being molded is deposited as the mold is filled. Reverse movement of rod 23 causes a withdrawal of member 18 from the space 27 between tapered sides 19 and the resilience of member 11 and the scissorlike movement of arms 20a and 20b permits the tapering sides 19 to move into contacting relation at the periphery, thereby to contract the inner mold member 11. A pair of cam followers 28a and 28b (FIG. 2) is supported on a clevis 30 carried on the upper end of rod 23 and the cam followers bear against inner surfaces of the upper portions of arms 20a and 20b which are specially shaped to provide a desired camming action in the insertion and withdrawal movements of wedging member 18.

As will be best understood by reference to FIG. 2, the inner surfaces of arms 20a and 20b above the connections with threaded rod 24 comprise an upper vertically disposed cam stretch 20x and an adjoining lower cam stretch 20z disposed at an oblique angle to stretch 20x. The cam followers 28a and 28b move with piston rod 23 and engage the oblique surfaces 20z in the retracted position which permits closing of the space or gap 27 to provide the aforementioned contacting movement of the tapered sides 19. As the rod is elevated, the oblique surface arrangement results in movement by the cam followers 28a and 28b outwardly against the resistance of springs 25 and the fixed connection of the upper ends of arms 20a and 20b with the inner mold 11 imparts a spreading movement to the abutting sides 19 defining the seam 15, thereby providing ample space for insertion of the upper end of insert member 18 in a wedging penetration. The slides of member 18 are slotted or recessed as shown at 37 and filled with a suitable packing composition 32 which provides an effective seal against any leakage between the top portion of member 18 and the tapered sides 19 defining the seam opening.

When the rod 23 is directed by the hydraulic piston in its withdrawal action, the cam followers 28a and 28b descend out of contact with the vertical surface 20x into contact with the oblique surface 20z and this movement continues to the position shown in FIG. 3 which permits the springs 25 to expand as shown in FIG. 3 and this expansion assists the movement of the arms 20a and 20b to an at rest position in the scissorlike movement. As will be readily understood by reference to FIG. 1, each of the pistons has an upper and lower line connection into its cylinder and the upper lines 33 are connected in series as are the lower lines 34. The control member for the actuation of the hydraulic pistons 22 may be of any suitable type and preferably synchronizes the piston actuation so that they move simultaneously with the same degree of force applied to each piston.

While the apparatus arrangement as shown in FIGS. 1 through 4 is a preferred arrangement and utilizes a hydraulic system for actuation of the moving parts, it will be appreciated that other types of drive means may be provided. Such means may comprise pneumatic circuit or mechanical drives. A typical arrangement for mechanical movement of the insert member has been illustrated in the fragmentary view, FIG. 5, showing a screw 35 actuating a rod 23 connected with the insert member 18 to provide the necessary insert and withdrawal movement. In FIG. 5, the housing supporting the screw mechanism 35 is designated 22x.

I claim:

1. In a mold for concrete pipe and the like having spaced inner and outer cylindrical mold members, the improvement which comprises a linear seam disposed throughout the length of a peripheral surface of the inner mold, and mechanism interiorly of the mold including a member adjacent the lengthwise extent of said seam having tapered sides for wedging insertion into the seam, at least one support means for said member with tapered sides, said support means including at least one pair of upright arms secured on said inner mold member and having a hinged, scissorlike mounting, spring members carried by the arms and maintained under compression when the member is inserted in the seam and expanding when said member is withdrawn from the seam; and drive means attached to the support means and arranged to force the member with tapered sides into the seams in a spreading and sealing action in one camming movement of the arms and springs for closing the seam during molding, and causing a withdrawal of said member from the seam in another camming movement of the arms and springs thereby reducing the dimension of said peripheral surface as the seam is closed to provide clearance with a formed shape in the mold.

2. An inner mold as defined in claim 1, wherein said mechanism includes a plurality of said support means supporting the insert member at intervals along its length and drive means mounted on each of said support means and connected to the insert member, said drive means being arranged for synchronized operation in said wedging and withdrawal actions.

3. An inner mold as defined in claim 1, having gasket material on the tapered sides of said insert member.

4. An inner mold as defined in claim 1, wherein said drive means is reversible whereby to be operable to force said insert member into the seam in one movement and withdraw it from the seam in a reverse movement.

5. An inner mold as defined in claim 1, wherein the edges of the inner mold abutting the seam taper outwardly and downwardly from contact surfaces at the outer periphery of the mold.

6. An inner mold as defined in claim 1, wherein said support means comprises two pairs of spaced upright arms with associated spring assemblies which are actuated by said drive means.

7. In a mold as defined in claim 1, cam means carried by said drive means in contact with coacting surfaces of said arms, vertical coacting surfaces thereof spreading the seam-defining surfaces of the mold when engaged by the cam means, and oblique coacting surfaces thereof permitting the seam-defining surfaces to contact when engaged by the cam means.

8. An inner mold form for casting concrete pipe and the like, comprising:
a substantially cylindrical member, said cylindrical member being opened longitudinally along its periphery whereby a slotlike opening is defined in said cylindrical member along its longitudinal dimension, said cylindrical member being made of a resilient material whereby the width of said slotlike opening and the diameter of said cylindrical member may be selectively varied by expanding or contracting said cylindrical member;
a longitudinal insert member positioned adjacent said slotlike opening, said insert member having tapered sides for wedging insertion into said slotlike opening;
cam follower means formed on said insert member;
first and second rigid arm means mounted on the interior of said cylindrical member on opposite sides, respectively, of said slotlike opening and adjacent said cam follower means, said rigid arm means being pivotally connected to each other to form a scissorlike structure which straddles said insert member and said slotlike opening, said rigid arm means defining cam surfaces on their facing edges for said cam follower means, said cam surfaces being shaped so that as said insert member is wedged into said slotlike opening the camming action of said cam follower means on the cam surfaces forces the scissorlike structure formed by said rigid arm means apart thereby to expand said cylindrical member and as said insert member is withdrawn from said slotlike opening the scissorlike structure formed by said rigid arm means closes thereby to contract said cylindrical member; and drive means connected to said insert member, said drive means being selectively operable to wedge said insert member into said slotlike opening and withdraw it therefrom.

9. The invention recited in claim 8, including biasing means for biasing the cam surfaces of said rigid arm means in contact with said cam follower means formed on said insert member.

10. The invention recited in claim 9, wherein said biasing means comprises a spring-biased rod mechanism.

11. The invention recited in claim 8, wherein:

a first portion of the cam surfaces defined by said rigid arm means are substantially parallel with respect to each other whereby as said cam follower means are moved along said first portion said rigid arms are held wedged apart;

a second portion of the cam surfaces defined by said rigid arm means are diverging with respect to each other whereby as said cam follower means are moved along said second portion towards said slotlike opening said rigid arm means are forced apart and as said cam follower means are moved along said second portion away from said slotlike opening said rigid arm means close towards each other; and said first and second portions of the cam surfaces are adjacent each other, said first portion being adjacent said slotlike opening, said second portion being remote from said slotlike opening.

12. An inner mold form for casting concrete pipe and the like, comprising:

a substantially cylindrical member, said cylindrical member being opened longitudinally along its periphery whereby a slotlike opening is defined in said cylindrical member along its longitudinal dimension;

a longitudinal insert member positioned adjacent said slotlike opening, said insert member having tapered sides for wedging insertion into said slotlike opening;

first and second rigid arm means mounted on the interior of said cylindrical member on opposite sides, respectively, of said slotlike opening, said rigid arm means being pivotally connected to each other to form a scissorlike structure which straddles said insert member and said slotlike opening;

biasing means connected between said rigid arm means, said biasing means being operable to bias said first and second rigid arm means towards each other whereby to bias said cylindrical member in a contracted position; and selectively operable means for wedging said insert member into said slotlike opening and withdrawing it therefrom.